US011942678B2

(12) United States Patent
Urtz et al.

(10) Patent No.: US 11,942,678 B2
(45) Date of Patent: Mar. 26, 2024

(54) MECHANISM FOR MOUNTING MULTIPLE RADIOS IN CLOSE PROXIMITY TO ANTENNA ON A CELL TOWER

(71) Applicant: JOHN MEZZALINGUA ASSOCIATES, LLC, Liverpool, NY (US)

(72) Inventors: Thomas Urtz, Liverpool, NY (US); Jeremy Benn, Liverpool, NY (US); Christopher P. Natoli, Baldwinsville, NY (US); Shawn M. Chawgo, Phoenix, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

(21) Appl. No.: 17/499,318

(22) Filed: Oct. 12, 2021

(65) Prior Publication Data

US 2022/0115773 A1 Apr. 14, 2022

Related U.S. Application Data

(60) Provisional application No. 63/093,537, filed on Oct. 19, 2020, provisional application No. 63/091,271, filed on Oct. 13, 2020.

(51) Int. Cl.
*H01Q 1/24* (2006.01)
*H01Q 1/52* (2006.01)

(52) U.S. Cl.
CPC ............... *H01Q 1/246* (2013.01); *H01Q 1/24* (2013.01); *H01Q 1/52* (2013.01)

(58) Field of Classification Search
CPC ........ H01Q 1/246; H01Q 1/52; H01Q 1/1228; H01Q 1/24
USPC .......................................................... 343/890
See application file for complete search history.

(56) References Cited

U.S. PATENT DOCUMENTS

| | | | | |
|---|---|---|---|---|
| 2016/0261030 A1* | 9/2016 | Kim | ..................... | H01Q 1/1264 |
| 2016/0365618 A1* | 12/2016 | Kim | ..................... | H01Q 1/1242 |
| 2017/0237160 A1* | 8/2017 | Kim | ......................... | B64G 1/66 343/745 |
| 2018/0026327 A1* | 1/2018 | Hendrix | ............... | H01Q 1/1228 455/562.1 |
| 2018/0351248 A1* | 12/2018 | Kim | ..................... | H01Q 1/1228 |
| 2021/0194109 A1* | 6/2021 | Shao | .................... | H01Q 1/1242 |

* cited by examiner

*Primary Examiner* — Hai V Tran
(74) *Attorney, Agent, or Firm* — Meunier Carlin & Curfman LLC

(57) ABSTRACT

Disclosed is a mechanism for mounting radio heads in close proximity to an antenna on a cell tower. In the examples disclosed, the mounting configurations enable easy access to each of the radios so that they can be serviced individually without interfering with the functioning of the other radio in its communications with the antenna.

7 Claims, 8 Drawing Sheets

MECHANISM FOR MOUNTING MULTIPLE RADIOS IN CLOSE PROXIMITY TO ANTENNA ON A CELL TOWER

This application is a non-provisional of and claims priority to U.S. Provisional Patent Application Ser. No. 63/091,271, filed Oct. 13, 2020, and U.S. Provisional Patent Application Ser. No. 63/093,537, filed Oct. 19, 2020, which applications are hereby incorporated by this reference in their entireties for all purposes as if fully set forth herein.

BACKGROUND OF THE INVENTION

Field of the Invention

The present invention relates to wireless communications, and more particularly, to cellular radio heads configured to be mounted on cell towers in close proximity to their antennas.

Related Art

Mounting one or more radios on a cell tower so that they can be in close proximity to the antennas to which they are coupled presents challenges in that the radios may be difficult to service. Accordingly, there is a need for a mounting configuration that enables the radios to be individually serviced without mechanically interfering with the antenna and also without interfering with the other radios mounted in close proximity to the antenna and the other radios.

SUMMARY OF THE INVENTION

An aspect of the present invention involves an antenna mounting mechanism for mounting at least one radio head in close proximity to a coupled cellular antenna. The antenna mounting mechanism comprises a first mounting plate configured to be coupled to a first radio head; a first upper slide mount coupled to an upper edge of the first mounting plate; a first lower slide mount coupled to a lower edge of the first mounting plate; and a first mounting sleeve coupled to the first upper slide mount and the first lower slide mount, the first mounting sleeve configured to be rotatably mounted to a pole, wherein the first mounting sleeve is configurable to position the first radio head between the antenna and the pole.

Another aspect of the present invention involves a method for configuring a radio head to enable it to be serviced, wherein the radio head is mounted to a pole and disposed between the pole and an antenna. The method comprises releasing an engagement pin, the engagement pin coupled to a slide mount; translating the radio head in a direction perpendicular to a vector normal to an array face of the antenna; and rotating the radio head away from the antenna.

Another aspect of the present invention involves an antenna mounting mechanism for mounting two radio heads in close proximity to a coupled cellular antenna. The antenna mounting mechanism comprises an upper radio head slide bracket coupled to an upper antenna mount via a first plurality of mounting bolts, wherein the upper radio head slide bracket and the upper antenna mount are disposed on opposite sides of a pole; an upper radio head mounting bracket that is coupled to the pole; an upper radio head mounting plate that is coupled to the upper radio head slide bracket and the upper radio head mounting bracket; a lower radio head slide bracket that is coupled to the pole; a lower radio head mounting bracket that is coupled to a lower antenna mount via a second plurality of mounting bolts; and a lower radio head mounting plate that is coupled to the lower radio head slide bracket and the lower radio head mounting bracket.

Another aspect of the present invention involves an antenna mounting mechanism for mounting two radio heads in close proximity to a coupled cellular antenna. The antenna mounting mechanism comprises a plurality of mounting plates, each mounting plate having an upper slide mount and a lower slide mount, each mounting plate configured to have a radio affixed thereto; a base plate coupled to the upper slide mount and lower slide mount of each of the plurality of mounting plates, wherein the upper slide mount and lower slide mount of each of the plurality of mounting plates are configured to translate the corresponding mounting plate laterally relative to the base plate; an upper tilt bracket mechanically coupled in proximity to an upper edge of the base plate and configurable to be mechanically coupled to an upper edge of the cellular antenna; a lower pivot mounting bracket mechanically coupled in proximity to a lower edge of the base plate and configured to be rotatably coupled in proximity to a lower edge of the cellular antenna; and an upper mounting bracket and a lower mounting bracket respectively mechanically coupled in proximity to an upper edge and a lower edge of the base plate, wherein the upper mounting bracket and the lower mounting bracket are configured to be mechanically coupled to a pole.

DESCRIPTION OF EXEMPLARY EMBODIMENTS

Figure 1:
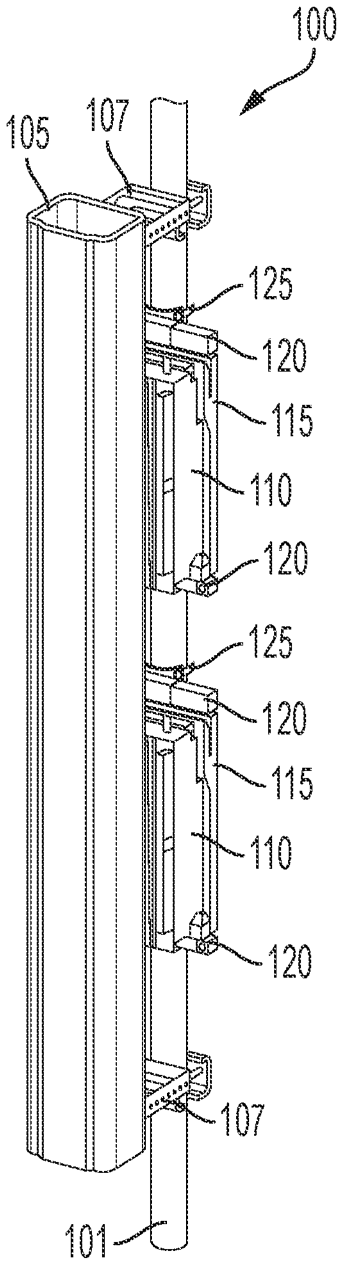
FIG. 1 illustrates a first exemplary mounting mechanism for mounting two radio heads in close proximity to a coupled cellular antenna according to the disclosure.

FIG. 1 illustrates an antenna and radio head configuration 100 having a first exemplary mounting mechanism for mounting two radio heads in close proximity to a coupled cellular antenna according to the disclosure. Antenna and radio head configuration 100 includes a cellular antenna 105 and two radio heads 110. Antenna 105 is mechanically coupled to a pole 101 via two antenna mounts 107. Mounted between antenna 105 and pole 101 are two radio heads 110, each of which are mounted to a mounting plate 115, which is coupled to upper and lower slide mounts 120. Mounting plate 115 and upper and lower slide mounts 120 are mechanically coupled to pole 101. The configuration illustrated in FIG. 1 is for nominal operation of the combination of antenna 105 and the two radio heads 110, although not shown are the RF cables coupling the radio heads 110 to the antenna 105.

Figure 2:
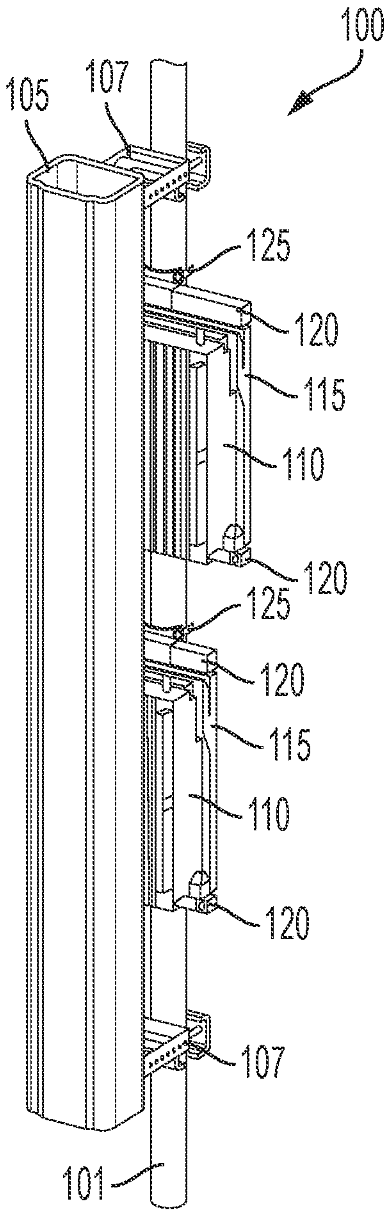
FIG. 2 illustrates the first exemplary mounting mechanism of FIG. 1 with one radio head translated laterally using a first exemplary mounting mechanism according to the invention.

FIG. 2 illustrates the first exemplary mounting mechanism of FIG. 1 with one radio head 110 translated laterally outward using a first exemplary mounting mechanism according to the invention. Lateral translation of radio head 110 is enabled by the engagement pins illustrated on the top of upper slide mount 120 and sliding radio head 110 mechanically coupled to mounting plate 115 using upper and lower slide mounts 120. Note that upper and lower radio heads 110 may be laterally translated independently.

Figure 3:
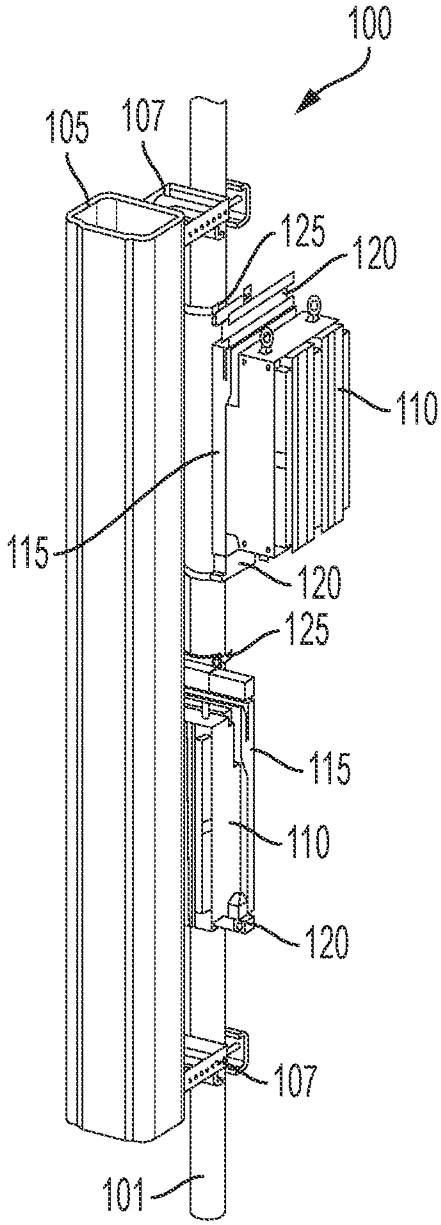
FIG. 3 illustrates the first exemplary mounting mechanism of FIG. 2 with one radio head translated laterally and rotated outward using a first exemplary mounting mechanism according to the invention.

FIG. 3 illustrates the first exemplary mounting mechanism of FIG. 2 with one radio head 110 translated laterally and rotated outward using a first exemplary mounting mechanism according to the invention. To enable this, the combination of mounting plate 115 and upper and lower slide mounts 120 are coupled to mounting sleeve 125, which rotatably fixes radio head 110, mounting plate 115 and upper and lower slide mounts 120 so that the combination may rotate around pole 101. In doing so, laterally translating radio head 110 outward from behind antenna 105 allows the combination to be rotated in such a way that radio head 110 does not make physical contact with antenna 105. This enables a technician to service upper radio head 110 without interfering with the antenna 105 and also without interfering with—in this example—lower radio head 110 in operation with antenna 105. In other words, the first exemplary mounting mechanism (e.g., the combination of mounting plate 115, upper and lower slide mounts 120 and mounting sleeve 125) enables a technician to have access to one radio head 110 (upper or lower) without interfering with the operation of the other radio head 110 as it is electrically coupled to antenna 105.

Figure 4:
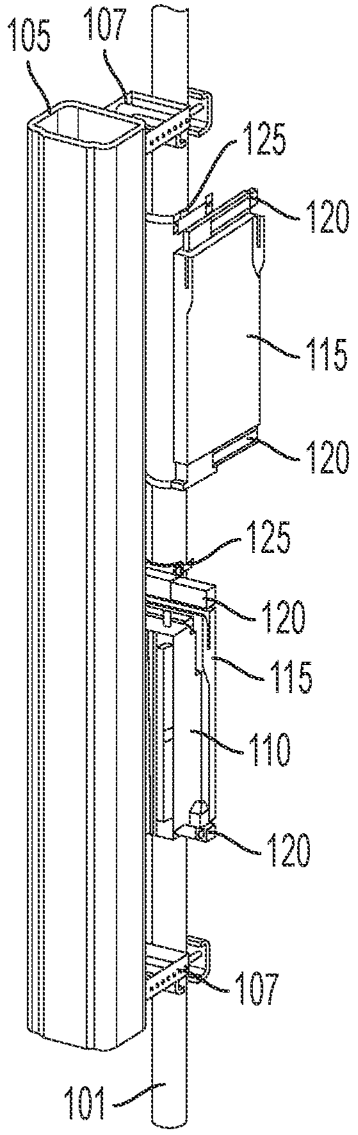
FIG. 4 illustrates first exemplary mounting mechanism of FIG. 3 with the radio head removed, further illustrating a first exemplary mounting mechanism according to the invention.

FIG. 4 illustrates first exemplary mounting mechanism of FIG. 3 with the radio head 110 removed, further illustrating a first exemplary mounting mechanism (e.g., the combination of mounting plate 115, upper and lower slide mounts 120 and mounting sleeve 125) according to the invention.

Figure 5:
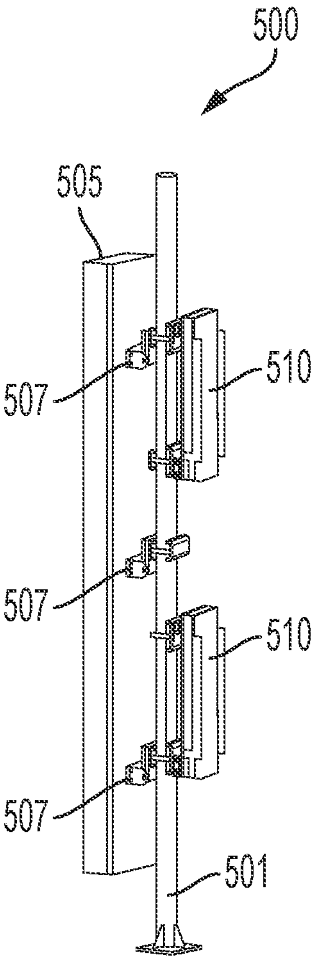
FIG. 5 illustrates a second exemplary mounting mechanism for mounting two radio heads in close proximity to a coupled cellular antenna according to the disclosure.

FIG. 5 illustrates a second exemplary mounting mechanism for mounting two radio heads 510 in close proximity to a coupled cellular antenna 505 according to the disclosure. Antenna 505 is mechanically coupled to a pole 501 using three antenna mounts 507.

Figure 6:
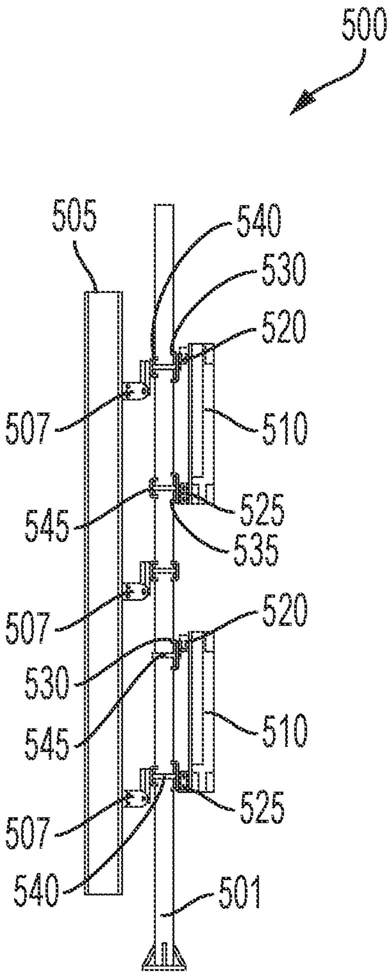
FIG. 6 illustrates the second exemplary mounting mechanism of FIG. 5 along an axis perpendicular to the array face of the antenna.

FIG. 6 illustrates the second exemplary mounting mechanism of FIG. 5 along an axis perpendicular to a vector normal to the array face of the antenna 505. Further illustrated are upper radio head 510 that is coupled to pole 501 via an upper radio head slide bracket 520 that mechanically couples to a pole bracket 530, and via an upper radio head mounting bracket 525 that mechanically couples to another pole bracket 530. Upper radio head slide bracket 520 and upper radio head mounting bracket 525 may both be coupled to an upper radio head mounting plate (not shown) to which upper radio head is mounted.

Lower radio head 510 is coupled to pole 501 via a lower radio head slide bracket 520 that mechanically couples to a pole bracket 530, and via a lower radio head mounting bracket 525 that mechanically couples to another pole bracket 530.

Upper radio head slide bracket 520 is coupled via pole bracket 530 such that pole bracket 530 is mechanically coupled to upper antenna mount 507 via two mounting bolts 540; and upper radio head mounting bracket 525 engages with pole 501 via a pole bracket that is affixed to pole 510 via friction bracket 545.

Lower radio head slide bracket 520 is coupled via pole bracket 530 such that pole bracket 530 is mechanically coupled to pole 501 via friction bracket 545; and lower radio head mounting bracket 525 engages with pole 501 via pole bracket 530 such that pole bracket 530 is mechanically coupled to lower antenna mount 507 via two mounting bolts 540. Lower radio head slide bracket 520 and lower radio head mounting bracket 525 may both be coupled to a lower radio head mounting plate (not shown) to which lower radio head is mounted.

Figure 7:
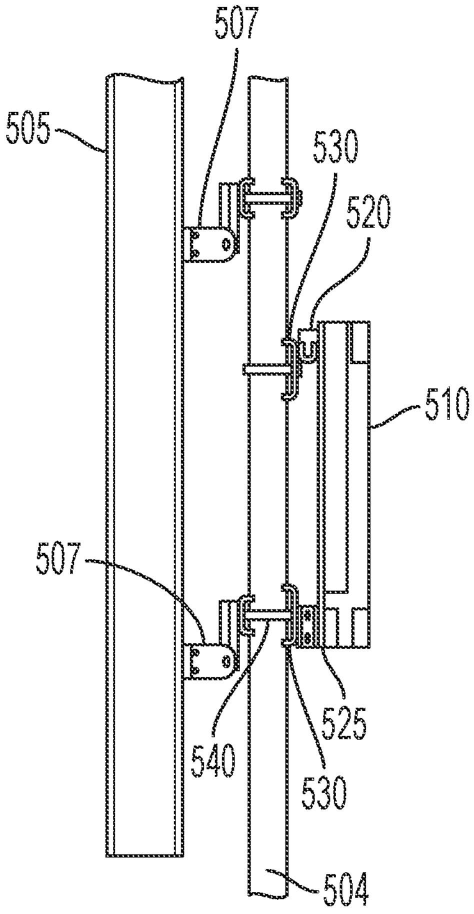
FIG. 7 is a close up view of FIG. 6, more closely illustrating the mounting mechanism for the lower radio head of the two radio heads.
Figure 8:
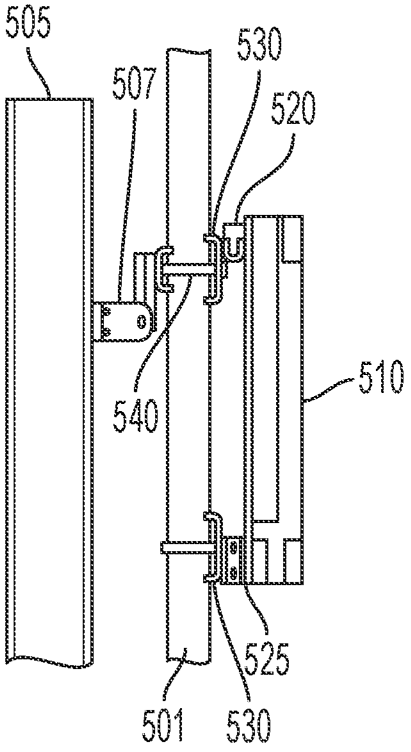
FIG. 8 is a close up view of FIG. 6, more closely illustrating the mounting mechanism for the upper radio head of the two radio heads.

FIG. 7 is a close up view of FIG. 6, more closely illustrating the mounting mechanism for the lower radio head of the two radio heads; and FIG. 8 is a close up view of FIG. 6, more closely illustrating the mounting mechanism for the upper radio head of the two radio heads.

Figure 9:
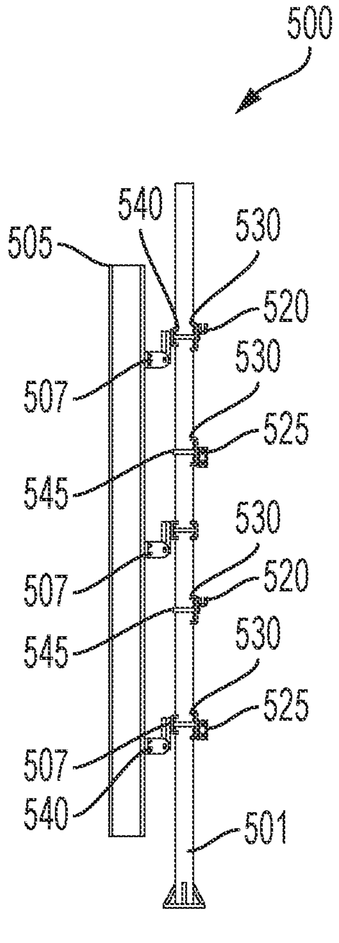
FIG. 9 illustrates the antenna and mounting configuration of FIG. 6 with the radio heads removed.
Figure 10:
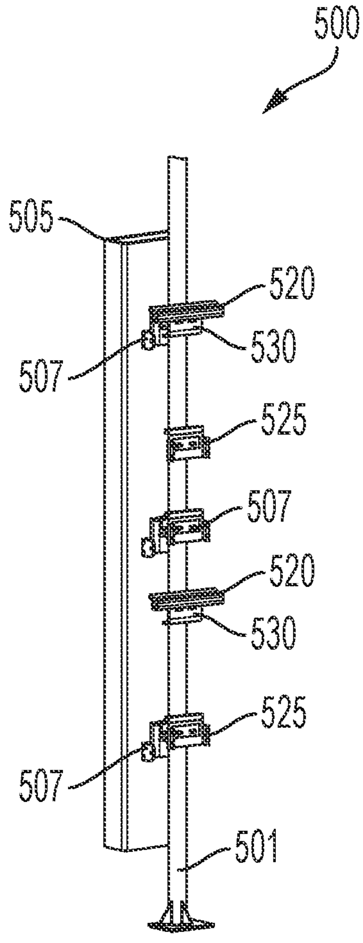
FIG. 10 is an iso view of the antenna configuration of FIG. 9.

FIG. 9 illustrates the antenna and mounting configuration of FIG. 6 with the radio heads removed; and FIG. 10 is an iso view of the antenna configuration of FIG. 9.

Figure 11:
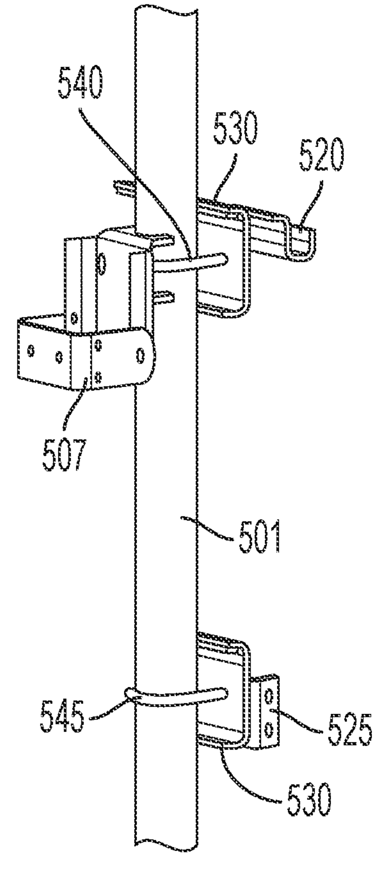
FIG. 11 is a close up FIG. 10, further illustrating the mounting mechanism for the upper radio of the two radios.

FIG. 11 is a close up FIG. 10, further illustrating the mounting mechanism for the upper radio of the two radios.

Figure 12:
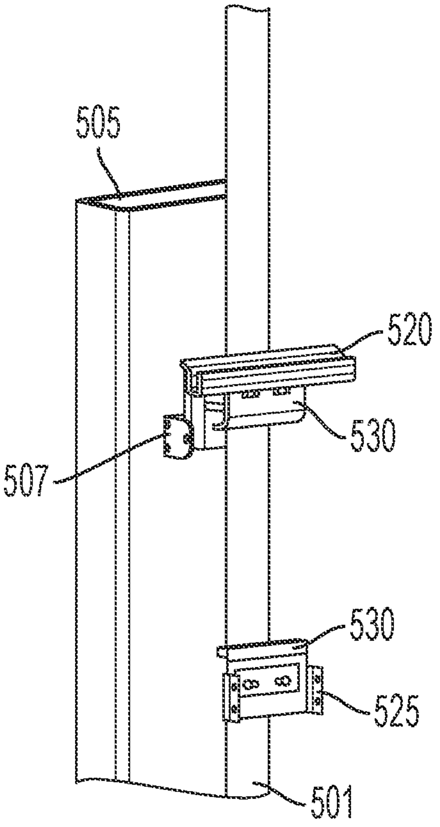
FIG. 12 is another view of the antenna configuration of FIG. 9 from another off angle, further illustrating the mounting mechanism for the upper radio of the two radios.
Figure 13:
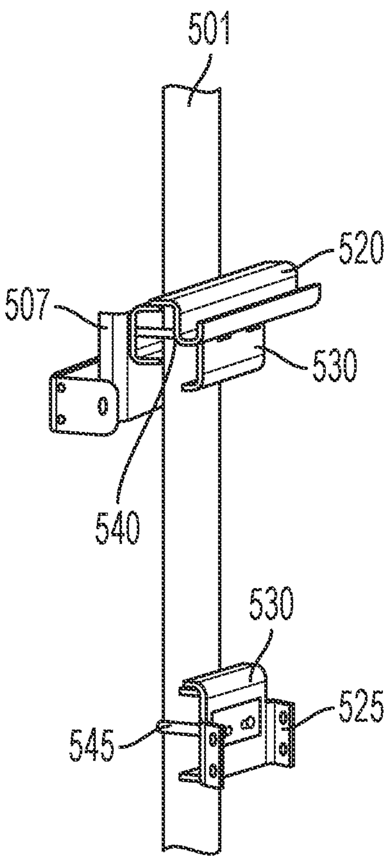
FIG. 13 illustrates the antenna configuration of FIG. 12, with the antenna removed.
Figure 14:
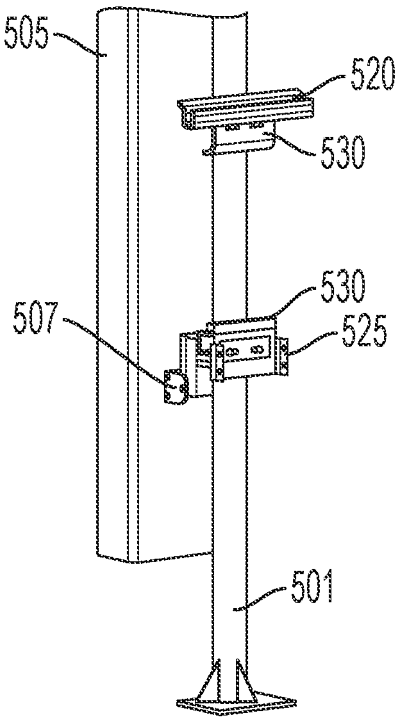
FIG. 14 is a close up FIG. 10, further illustrating the mounting mechanism for the lower radio of the two radios.

FIG. 12 is another view of the antenna configuration of FIG. 9 from another angle, further illustrating the mounting mechanism for the upper radio of the two radios; and FIG. 13 illustrates the antenna configuration of FIG. 12, with the antenna removed; and FIG. 14 is a close up FIG. 10, further illustrating the mounting mechanism for the lower radio of the two radios.

Figure 15:
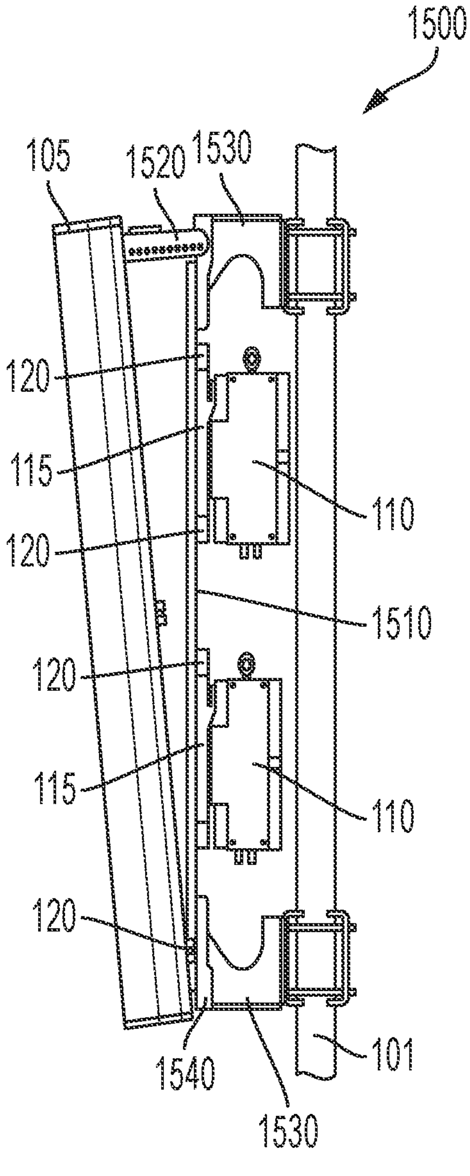
FIG. 15 illustrates another exemplary mechanism for mounting radios in close proximity to an antenna according to the disclosure, along with the radios and antenna.

FIG. 15 illustrates another exemplary mechanism 1500 for mounting radios 110 in close proximity to an antenna 105 according to the disclosure. In this example, radios 110 are each mounted a mounting plate 115; and each mounting plate 115 is mounted to a base plate 1510 via upper and lower slide mounts 120, which enable the mounting plate 115 and its attached radio 110 to be translated laterally in a manner similar to that described above. Base plate 1510 is mounted to pole 101 via mounting brackets 1530. The dimensions and shape of mounting brackets 530 are such that they provide a standoff distance from the radios 110 to the pole 101 such that they are sufficiently close to the pole 101 to minimize a downward torque on pole 101 while providing sufficient distance for radio models that have a greater "thickness". Further, mounting brackets 1530 may have a cutout shape to provide clearance for radios 110 that are "longer" in dimension.

As illustrated in FIG. 15, antenna 105 may be mounted so that it is in a fixed downward orientation. This may be enabled by an upper tilt bracket 1520, which mechanically couples antenna 105 to upper mounting bracket 1530; and a lower pivot mount 1540, which couples antenna 105 to lower mounting bracket 1530. Upper tilt bracket 1520 may be configurable to enable antenna 105 to be tilted at different fixed angles. Alternatively, antenna 105 may be mounted to base plate 1510 so that antenna 105 is fixed and parallel to base plate 1510. It will be understood that such variations are possible and within the scope of the disclosure.

Figure 16:
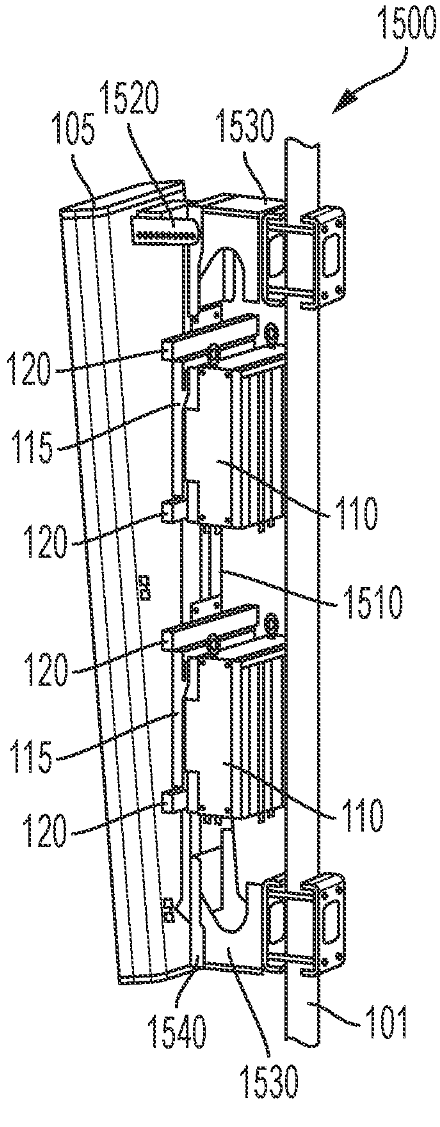
FIG. 16 is an iso view of the mechanism and associated antenna and radios of FIG. 15.

FIG. 16 is an iso view of the exemplary mechanism 1500 of FIG. 15, along with antenna 105 and radios 110.

What is claimed is:

1. An antenna mounting mechanism for mounting at least one radio head in close proximity to a coupled cellular antenna, comprising:

a first mounting plate configured to be coupled to a first radio head;

a first upper slide mount coupled to an upper edge of the first mounting plate;

a first lower slide mount coupled to a lower edge of the first mounting plate; and a first mounting sleeve coupled to the first upper slide mount and the first lower slide mount, the first mounting sleeve configured to be rotatably mounted to a pole and rotatable about an axis parallel to the pole, wherein the first mounting sleeve is configurable to position the first radio head between the antenna and the pole.

2. The antenna mounting mechanism of claim 1, further comprising:

a second mounting plate configured to be coupled to a second radio head;

a second upper slide mount coupled to an upper edge of the second mounting plate;

a second lower slide mount coupled to a lower edge of the second mounting plate; and a second mounting sleeve coupled to the second upper slide mount and the second lower slide mount, the second mounting sleeve configured to be rotatably mounted to the pole and rotatable about another axis parallel to the pole, wherein the second mounting sleeve is configurable to position the second radio head between the antenna and the pole.

3. The antenna mounting mechanism of claim 2, wherein the first mounting sleeve is configurable to be mounted on the pole above the second mounting sleeve, and wherein the first mounting sleeve and the second mounting sleeve are configurable to rotate independently.

4. The antenna mounting mechanism of claim 1, wherein the first axis parallel to the pole and the second axis parallel to the pole are substantially the same axis.

5. A method for configuring a radio head to enable it to be serviced, wherein the radio head is rotataby mounted to a pole and disposed between the pole and an antenna, comprising:

releasing an engagement pin, the engagement pin coupled to a slide mount;

translating the radio head in a direction perpendicular to a vector normal to an array face of the antenna; and rotating the radio head away from the antenna about an axis parallel to an axis of the pole.

6. An antenna mounting mechanism for mounting two radio heads in close proximity to a coupled cellular antenna, comprising:

an upper radio head slide bracket coupled to an upper antenna mount via a first plurality of mounting bolts, wherein the upper radio head slide bracket and the upper antenna mount are disposed on opposite sides of a pole, and wherein the upper radio head slide bracket is disposed on an opposite side of the pole as the antenna;

an upper radio head mounting bracket that is coupled to the pole;

an upper radio head mounting plate that is coupled to the upper radio head slide bracket and the upper radio head mounting bracket;

a lower radio head slide bracket that is coupled to the pole;

a lower radio head mounting bracket that is coupled to a lower antenna mount via a second plurality of mounting bolts; and a lower radio head mounting plate that is coupled to the lower radio head slide bracket and the lower radio head mounting bracket.

7. An antenna mounting mechanism for mounting two radio heads in close proximity to a coupled cellular antenna, comprising:

a plurality of mounting plates, each mounting plate having an upper slide mount and a lower slide mount, each mounting plate configured to have a radio affixed thereto;

a base plate coupled to the upper slide mount and lower slide mount of each of the plurality of mounting plates, wherein the upper slide mount and lower slide mount of each of the plurality of mounting plates are configured to translate the corresponding mounting plate laterally relative to the base plate;

an upper tilt bracket mechanically coupled in proximity to an upper edge of the base plate and configurable to be mechanically coupled to an upper edge of the cellular antenna;

a lower pivot mounting bracket mechanically coupled in proximity to a lower edge of the base plate and configured to be rotatably coupled in proximity to a lower edge of the cellular antenna; and an upper mounting bracket and a lower mounting bracket respectively mechanically coupled in proximity to an upper edge and a lower edge of the base plate, wherein the upper mounting bracket and the lower mounting bracket are configured to be mechanically coupled to a pole, wherein the upper mounting bracket and the lower mounting bracket are configured to mount the base plate in a parallel orientation to the pole, wherein the upper mounting bracket and the lower mounting bracket are configured to mount the base plate in a parallel orientation to the pole.

* * * * *